(12) United States Patent
Liu et al.

(10) Patent No.: US 7,618,300 B2
(45) Date of Patent: Nov. 17, 2009

(54) METHOD OF SYNTHESIZING SMALL-DIAMETER CARBON NANOTUBES WITH ELECTRON FIELD EMISSION PROPERTIES

(75) Inventors: Jie Liu, Chapel Hill, NC (US); Chunsheng Du, Davis, CA (US); Cheng Qian, Durham, NC (US); Bo Gao, Elon, NC (US); Qi Qiu, Cary, NC (US); Otto Z. Zhou, Chapel Hill, NC (US)

(73) Assignees: Duke University, Durhan, NC (US); Xintek, Inc., Research Triangle Park, NC (US)

( * ) Notice: Subject to any disclaimer, the term of this patent is extended or adjusted under 35 U.S.C. 154(b) by 0 days.

(21) Appl. No.: 11/012,341

(22) Filed: Dec. 16, 2004

(65) Prior Publication Data

US 2006/0055303 A1 Mar. 16, 2006

Related U.S. Application Data

(60) Provisional application No. 60/531,978, filed on Dec. 24, 2003.

(51) Int. Cl.
*H01J 1/304* (2006.01)
(52) U.S. Cl. .......................... 445/24; 313/495
(58) Field of Classification Search .................. 445/24, 445/25; 313/495–497, 293–302
See application file for complete search history.

(56) References Cited

U.S. PATENT DOCUMENTS 4,572,813 A 2/1986 Arakawa
4,663,230 A 5/1987 Tennent (Continued)

OTHER PUBLICATIONS

H. Dai et al., "Single-wall nanotubes produced by metal-catalyzed disproportionation of carbon monoxide", *Chem. Phys. Lett.* 260 (1996), pp. 471-475.

(Continued)

*Primary Examiner*—Nimeshkumar D. Patel
*Assistant Examiner*—Christopher M Raabe
(74) *Attorney, Agent, or Firm*—Jenkins, Wilson, Taylor & Hunt, P.A.

(57) ABSTRACT

Carbon nanotube material having an outer diameter less than 10 nm and a number of walls less than ten are disclosed. Also disclosed are an electron field emission device including a substrate, an optionally layer of adhesion-promoting layer, and a layer of electron field emission material. The electron field emission material includes a carbon nanotube having a number of concentric graphene shells per tube of from two to ten, an outer diameter from 2 to 8 nm, and a nanotube length greater than 0.1 microns. One method to fabricate carbon nanotubes includes the steps of (a) producing a catalyst containing Fe and Mo supported on MgO powder, (b) using a mixture of hydrogen and carbon containing gas as precursors, and (c) heating the catalyst to a temperature above 950° C. to produce a carbon nanotube. Another method of fabricating an electron field emission cathode includes the steps of (a) synthesizing electron field emission materials containing carbon nanotubes with a number of concentric graphene shells per tube from two to ten, an outer diameter of from 2 to 8 nm, and a length greater than 0.1 microns, (b) dispersing the electron field emission material in a suitable solvent, (c) depositing the electron field emission materials onto a substrate, and (d) annealing the substrate.

10 Claims, 8 Drawing Sheets

U.S. PATENT DOCUMENTS

| | | | |
|---|---|---|---|
| 5,165,909 | A | 11/1992 | Tennent et al. |
| 5,591,312 | A | 1/1997 | Smalley |
| 6,183,714 | B1 | 2/2001 | Smalley et al. |
| 6,221,330 | B1 | 4/2001 | Moy et al. |
| 6,232,706 | B1 | 5/2001 | Dai et al. |
| 6,277,318 | B1 | 8/2001 | Bower et al. |
| 6,303,094 | B1 | 10/2001 | Kusunoki et al. |
| 6,333,016 | B1 | 12/2001 | Resasco et al. |
| 6,346,189 | B1 | 2/2002 | Dai et al. |
| 6,413,487 | B1 | 7/2002 | Resasco et al. |
| 6,553,096 | B1 | 4/2003 | Zhou et al. |
| 6,876,724 | B2 | 4/2005 | Zhou et al. |
| 7,070,472 | B2 * | 7/2006 | Dean et al. .................... 445/24 |
| 2001/0024078 | A1 * | 9/2001 | Dimitrijevic et al. ........ 313/311 |
| 2003/0102222 | A1 | 6/2003 | Zhou et al. |
| 2004/0150312 | A1 * | 8/2004 | McElrath et al. ............ 313/310 |

OTHER PUBLICATIONS

International Preliminary Report dated Mar. 22, 2007 for corresponding International Application No. PCT/US2004/042704.

International Search Report dated Feb. 21, 2007 for corresponding International Application No. PCT/US04/42704.

* cited by examiner

METHOD OF SYNTHESIZING SMALL-DIAMETER CARBON NANOTUBES WITH ELECTRON FIELD EMISSION PROPERTIES

RELATED APPLICATION DATA

This application is based on and claims priority under 35 U.S.C. §119 (e) to U.S. Provisional Application No. 60/531,978, filed Dec. 24, 2003, the entire contents of which are incorporated herein by reference.

STATEMENT REGARDING FEDERALLY SPONSORED RESEARCH OR DEVELOPMENT

At least some aspects of this invention were made with Government support under the sponsorship of NASA, contract no. NAG-1-01061. The Government may have certain rights in this invention

FIELD OF THE INVENTION

A specific type of carbon nanotubes that have enhanced electron field emission properties and a method of synthesizing the carbon nanotubes is disclosed. The method includes a scalable one-step method for catalyst preparation and a process for the growth of nanotubes using chemical vapor deposition methods. It is related to methods of catalyst preparation, methods of nanotube synthesis and the use of the materials in field emission devices.

BACKGROUND OF THE INVENTION

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Carbon nanotubes can be synthesized by techniques that include: arc discharge between graphite electrode, chemical vapor deposition (CVD) through catalytic decomposition of hydrocarbon and laser evaporation of a carbon target. Examples of these methods are described in the literature: U.S. Pat. Nos. 4,572,813; 4,663,230; 5,165,909; 5,591,312; 6,183,714; 6,221,330; 6,232,706; 6,303,094; 6,333,016; 6,346,189; and 6,413,487. CVD methods represent one approach for industrial scale preparation of nanotubes.

CVD is a term used to represent heterogeneous reactions in which both solid and volatile reaction products are formed from a volatile precursor, and the solid reaction products are deposited on a substrate. CVD has become a common method for thin film growth on various solid substrates. CVD of carbon has been successful in making carbon films, fibers, carbon-carbon composites and multiwalled carbon nanotube (MWNT) materials at industrial scale. Only recently, however, has the growth of single-walled carbon nanotube (SWNTs) using CVD become possible. See, for example, Dai, H., et al., Chem. Phys. Lett. (1996), 260, 471-475. Currently, both SWNTs and MWNTs can be synthesized using CVD methods.

There has been active research and product development using these nanotubes as electron source. For example, carbon nanotubes have been described for use as field emission electron sources. Other applications for nanotubes have been proposed, such as flat panel displays, x-ray devices, and so forth. For device applications, it is preferably that the electron field emission cathodes have long operating lifetime (>100 hours) and emission stability.

Electron field emission properties of nanotubes are found to depend on the structure and morphology of the carbon nanotubes. Because of the field enhancement factor, smaller diameter nanotubes tend to give a lower threshold field for emission. Experimental results have shown SWNTs tend to bundle together and that SWNT bundles tend to have a lower threshold field for emission than the MWNTs which have a larger diameter. Materials comprising individual SWNTs are expected to have an even lower threshold field than those of the SWNT bundles. However at present, macroscopic quantities of materials with discreet individual SWNTs are difficult to obtain.

Emission stability of nanotubes, especially at high emission current and current densities, depends on the quality of the nanotubes, such as the concentration of structural defects. SWNTs formed by the laser ablation method tend to have a higher degree of structural perfection than MWNTs formed by CVD methods. Experimentally, it has been demonstrated that SWNTs formed by the laser ablation methods are more stable at high emission currents than MWNTs formed by the CVD methods. The laser ablation method, however, is costly and produces a small quantity of materials.

SWNTs with a single graphene shell per tube are generally not chemically inert. They can be oxidized at elevated temperatures (>400° C.) and readily absorb chemical species on their surfaces, which can lead to changes in their electronic properties and, consequently, electron field emission properties. SWNTs can also be damaged by ion sputtering during emission leading to catastrophic failures. In the case of MWNTs with several concentric graphene shells, the inner graphene shells are protected by the outer graphene shells and, therefore, can be more chemically stable than the SWNTs.

It is therefore desirable to design and fabricate a structure that can overcome the shortcomings of both the SWNTs and regular MWNTs with large diameters for electron field emission applications.

SUMMARY OF THE INVENTION

A type of electron field emission material with enhanced emission characteristics and a method to fabricate such material are disclosed. The material comprises carbon nanotubes with diameters less than 10 nanometers (nm) and has several concentric shells of carbon tubules (hereafter referred to as few-walled carbon nanotubes (FWNTs)). By FWNTs, it is meant that the carbon nanotubes have from two to ten concentric shells of carbon tubules, preferably from two to eight, from two to five or from five to eight concentric shells of carbon tubules, and most preferably about three concentric shells of carbon tubules.

The method of fabrication includes a scalable one-step method for catalyst preparation and a process for the growth of nanotubes using chemical vapor deposition methods. One advantage of the method is the ease of catalyst preparation and the compatibility of the method with industrial scale production. The combination of the catalysts and growth conditions disclosed herein produce high quality small diameter and few-walled carbon nanotubes. The threshold voltage for field emission of electrons from these materials is lower or similar to the results reported for SWNT bundles. Further, these materials display higher emission current density and better long-term stability than prior SWNT bundles.

An exemplary method of manufacturing carbon nanotubes comprises the steps of (a) producing a catalyst containing Mo and one or more other metals supported on MgO powder, (b) using a gas mixture containing a carbon-containing gas as precursors; and (c) heating the catalyst and the gas mixture to a temperature above 900° C. to produce a carbon nanotube.

An exemplary carbon nanotube material comprises an outer diameter less than 10 nm and a number of walls less than ten.

An exemplary method of fabricating an electron field emission cathode comprises the steps of (a) synthesizing electron field emission materials containing carbon nanotubes with a number of concentric graphene shells per tube from 2 to 10, an outer diameter of from 2 to 8 nm, and a length greater than 0.1 microns, (b) dispersing the electron field emission material in a suitable solvent, (c) depositing the electron field emission materials onto a substrate, and (d) annealing the substrate.

An exemplary electron field emission device comprises a substrate, an optionally layer of adhesion-promoting layer, and a layer of electron field emission material, the electron field emission material including a carbon nanotube having a number of concentric graphene shells per tube of from 2 to 10, an outer diameter from 2 to 8 nm, and a nanotube length greater than 0.1 microns.

DESCRIPTION OF FIGURES

The objects and advantages of the invention will become apparent from the following detailed description of preferred embodiments thereof in connection with the accompanying drawings in which like numerals designate like elements and in which:

FIG. 5A shows an adhesion promotion layer deposited on a substrate; FIG. 5B shows a FWNT film deposited on the adhesion promotion layer by electrophoretic deposition (EPD); FIG. 5C shows FWNT emitters, after vacuum annealing, bonded strongly to the substrate through the adhesion promotion layer.

FIG. 6A shows a thin film containing FWNTs and adhesion promotion agents deposited on a substrate and FIG. 6B shows FWNT emitters, after vacuum annealing, bonded strongly to the substrate through the adhesion promotion agents.

DETAILED DESCRIPTION OF THE INVENTION

In general, the growth process for nanotubes synthesis involves a series of steps: (1) heating a catalyst material to high temperature, usually between 700° C. to 1000° C. The catalysts usually are nanoparticles composed of transition metals supported on either porous or flat supports. The catalyst can also be metal nanoparticles formed in gas phase and floating in the flow of feeding gas; (2) introduction of precursor gas containing a carbon source into the furnace; (3) diffusion and decomposition of precursor on the surface of catalyst nanoparticles and dissolution of carbon atoms within the metal nanoparticles; and (4) nucleation and growth of nanotubes from the metal nanoparticles saturated with carbon atoms.

Figure 1:
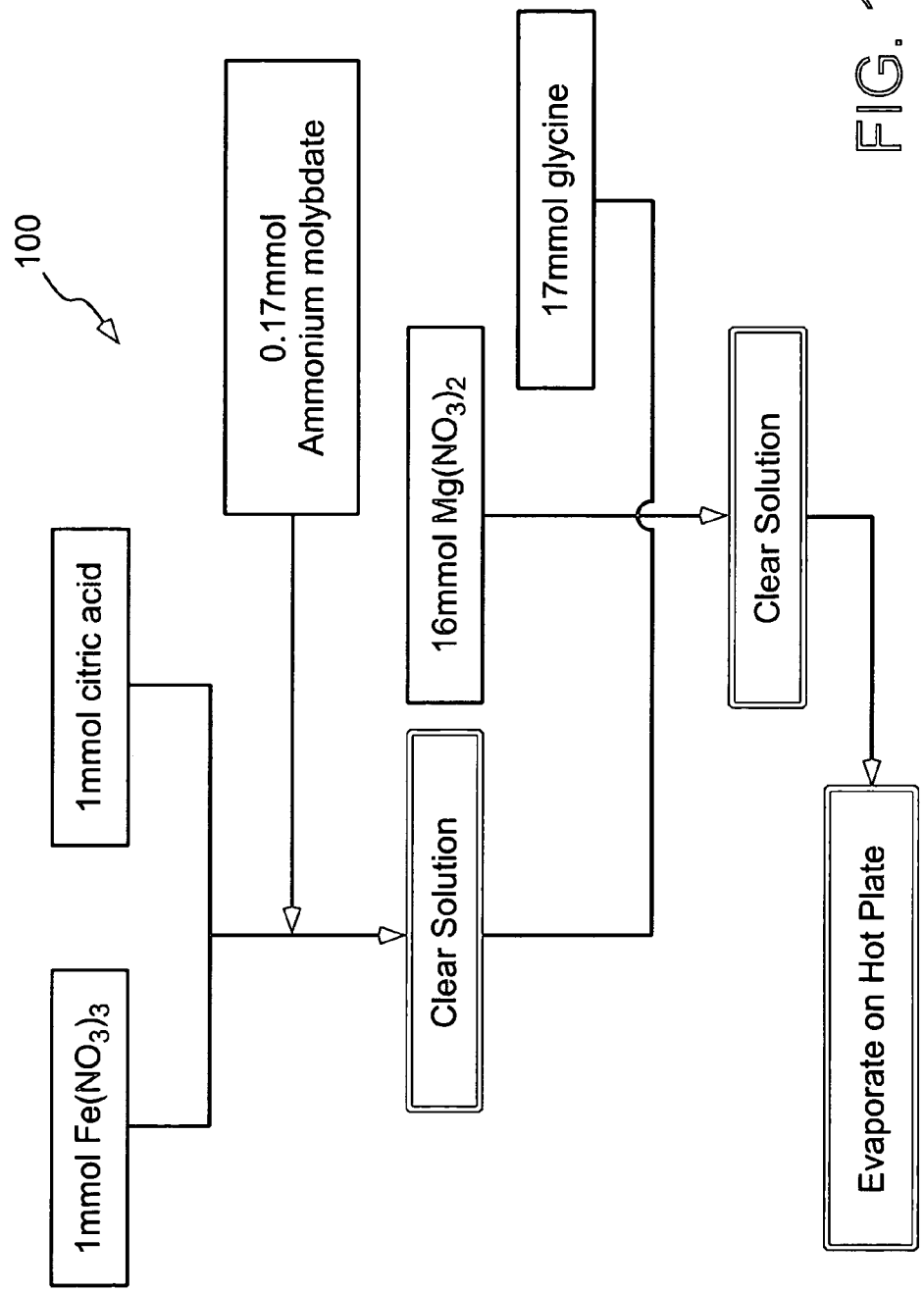
FIG. 1 is an illustration of an exemplary scheme for preparation of catalysts using a combustion method.
Figure 2:
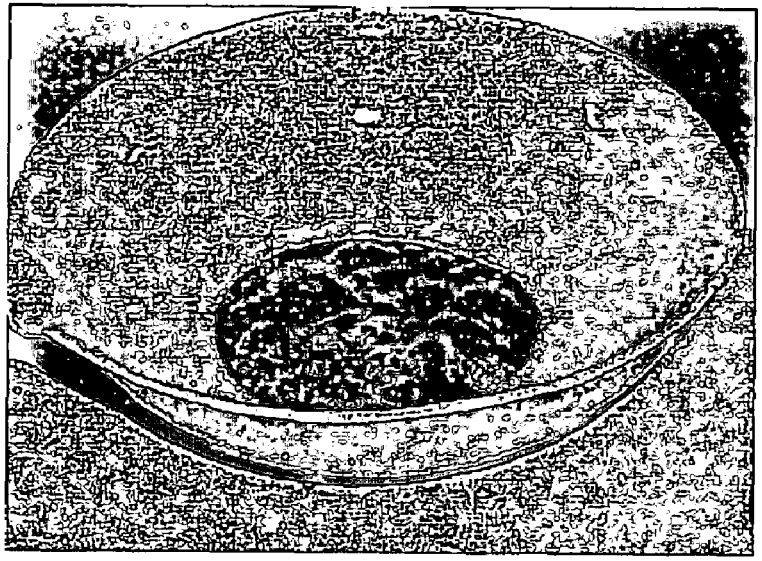
FIG. 2 is a photo of the catalyst being prepared.
Figure 2:
Figure 3:
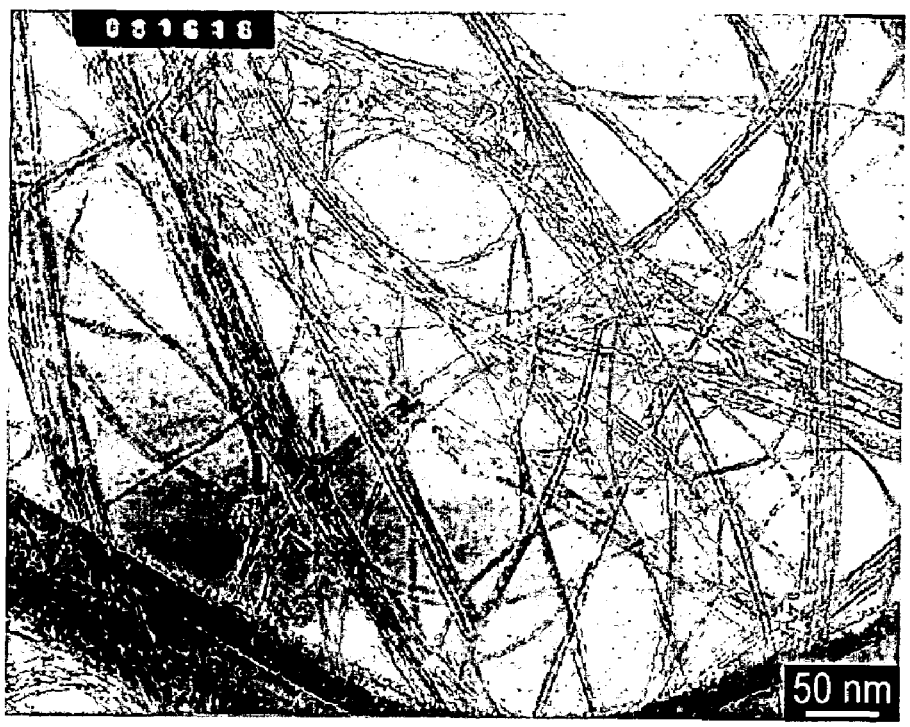
FIG. 3 is a Transmission Electron Microscope (TEM) image of FWNT materials produced by the method of FIG. 1.

FIG. 1 illustrates an exemplary scheme for preparation of catalysts. The method 100 is based on a combustion process, such as that generally used to produce complex oxides. This process 100 involves the exothermic reaction of an oxidizer (e.g., metal nitrates) and an organic fuel, typically glycine, urea, citric acid, or carbohydrazide. In a typical reaction, metal nitrates and fuel are dissolved in water to form a uniform precursor solution. During heating on a hot plate, the precursor dehydrates, decomposes, and then ruptures into a flame after about 10 min. The product is a voluminous, foamy powder which disperses into the entire volume of the reaction space with the fumes. The chemical energy released from this exothermic reaction can instantly heat the system to high temperatures (>1600° C.). Combustion synthesized powders are generally homogeneous, pure and single phase with high surface areas and small particle sizes.

In a typical process, 1 mMol $Fe(NO_3)_3$ and 1 mMol citric acid are dissolved in 20 ml of water under stirring. After adding 0.17 mMol Ammonium Molybdate, a clear solution is formed. In this solution, 16 mMol $Mg(NO_3)_2$ and 17 mMol Glycine are added, under stirring conditions, until a substantially uniform and clear solution is formed. The solution is slowly heated to 100° C. to evaporate water. After 10 minutes heating, the mixture burst into flame and fume. After the reaction stops, the produced powder is collected and heated at 300° C. for an hour before being used for nanotube growth.

Nanotube synthesis is carried in a CVD chamber using a mixed gas of $CH_4$ and $H_2$ at a reaction temperature above 950° C. The ratio between $H_2$ and $CH_4$ ranges from 1 to 20. In a typical process, the catalyst was introduced into a furnace and heated to the reaction temperature. Then, the mixture of $CH_4$ and $H_2$ was introduced into the furnace at a flow rate of 1000 sccm. The reaction lasted for about 30 minutes before cooling to room temperature and collecting the sample from the furnace.

The produced nanotube samples can be optionally purified by dissolving the catalyst support in dilute HCl. Further optional purification to remove amorphous carbon can be achieved using a number of techniques, as previously developed for SWNT purification.

Several techniques can be used to fabricate field emission cathodes using the thus synthesized FWNTs powders including spraying, spin-coating, casting, screen-printing, self-assembly and electrophoresis. In a preferred method, electrophoretic deposition (EPD) techniques are used to fabricate either patterned or homogeneous electron field emission cathodes. In a preferred method, the as-synthesized FWNTs are further processed such that they can be readily dispersed in a suitable solvent, such as ethyl alcohol or isopropyl alcohol. The basic method of the EPD technique has been disclosed in, for example, U.S. published patent application no. 2003/0102222 A1, the entire contents of which are herein incorporated by reference.

Figure 4A:
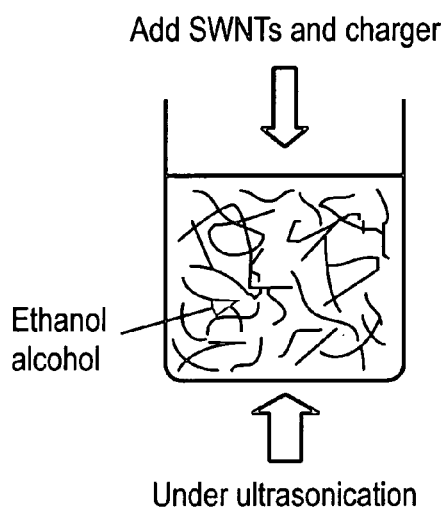
FIGS. 4A and 4B are a schematic illustration of a setup for electrophoretic deposition (EPD) of nanotube thin film on electrodes.
Figure 4B:
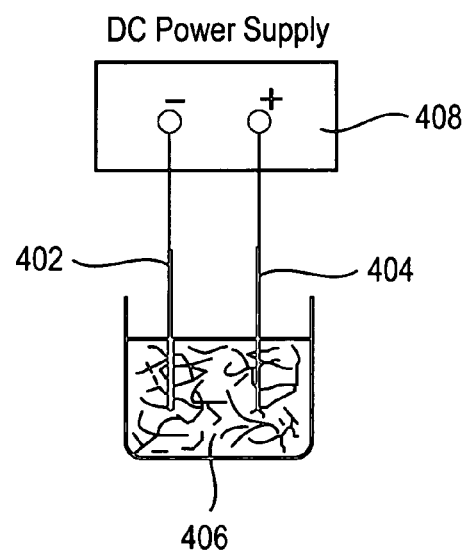

EPD techniques are used to deposit FWNTs on to suitable electrodes for field emission characterization. EPD techniques offer rigid control over the FWNT film thickness and packing density on the cathodes. The adhesion between the FWNT coating and the substrate can be enhanced by an adhesion promotion layer. In a typical process, FWNTs are added to ethanol alcohol and ultrasonicated for up to several hours until a substantially uniform suspension is obtained. The FWNTs in the liquid move in response to an electric field when they carry charges. Typically, charges are introduced to the FWNTs by adding some metal salts to the suspension, although other methods may be used. The salts dissociate in the liquid and the FWNTs selectively absorb the metal ions and thus are positively charged. The electrophoresis is performed as shown in FIGS. 4A and 4B. A cathode substrate 402 and a counter electrode 404 are immersed in the nanotube suspension 406 and are kept parallel to each other. During deposition, a positive DC voltage is applied by DC power supply 408 between the counter electrode 404 and the substrate 402. Under the electric field, at least a portion, preferably a majority and more preferably all, of the positively charged SWNTs migrate toward and deposit on the substrate 402.

Figure 5A:
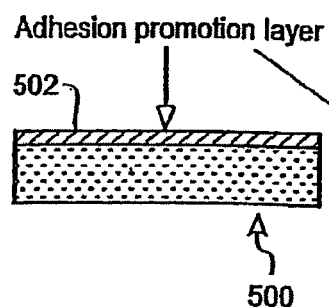
FIGS. 5A to 5C are a schematic illustration of one exemplary structure to fabricate adherent FWNT field emission cathodes.
Figure 5B:
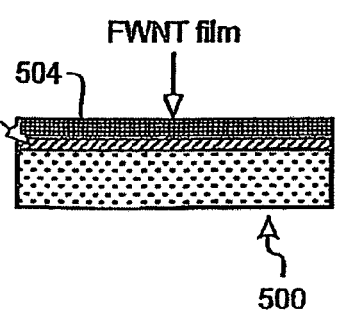
Figure 5C:
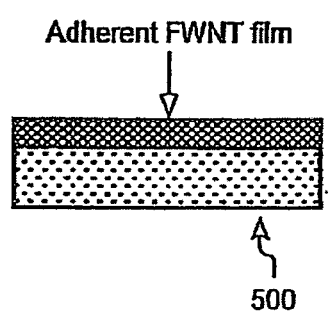

To make an adherent FWNT cathode, according to one embodiment, an adhesion promotion layer is deposited on a substrate (see, for example, layer 502 of FIG. 5A). The layer can be made from any carbide forming metals (such as Fe, Ti, Co, and Ni), various kinds of glass frits or mixtures thereof. The layer can be deposited on the substrate by different techniques including vacuum evaporation, sputtering, electroplating and EPD. A FWNT film is deposited on the adhesion promotion layer by EPD (see, for example, FWNT film 504 of FIG. 5B). The cathode is subsequently annealed under dynamic vacuum (at, for example, $5 \times 10^6$ torr) at high temperature (up to 1000° C.) to bond the FWNT emitters strongly to the substrate through the adhesion promotion layer (see, the FWNT cathode 500 of FIG. 5C).

Figure 6A:
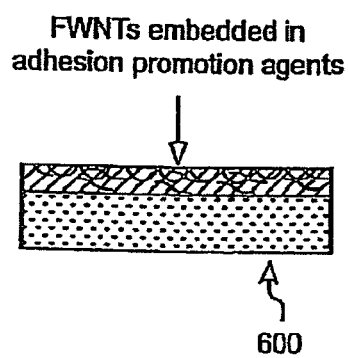
FIGS. 6A and 6B are a schematic illustration of another exemplary structure to fabricate adherent FWNT field emission cathodes.
Figure 6B:
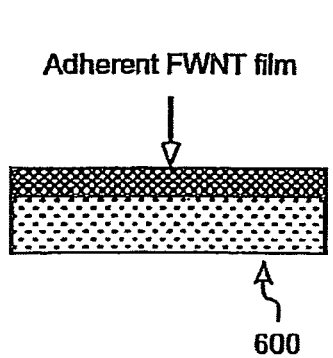

According to another embodiment, an adherent FWNT cathode can also be made by depositing a thin film containing FWNTs and some adhesion promotion agents on a substrate (see, for example, the FWNT cathode 600 of FIG. 6A). The adhesion promotion agents can be powders of any carbide forming metals (such as Fe, Ti, Co, and Ni), any glass frits or mixtures thereof. The thin film can be deposited on the substrate by suitable techniques, such as EPD technique. In the EPD technique, a mixture of FWNTs and adhesion promotion agents are suspended in ethanol alcohol and are co-deposited on the substrate when an electric field is applied to the suspension. Then, the cathode is annealed under dynamic vacuum (at, for example, $5 \times 10^6$ torr) at high temperature (up to 1000° C.) to bond the FWNT emitters strongly to the substrate through the adhesion promotion agents (see, the FWNT cathode 600 of FIG. 6B).

The process can also include an optional activation step. In the activation process, the excess nanotubes that are not bonded to the cathodes are removed by any one or more of a variety of suitable methods including: blowing, rubbing, and brushing (see for example, U.S. Pat. No. 6,277,318, the entire contents of which are herein incorporated by reference). The remaining nanotube film adheres strongly to the substrate surface.

Figure 7:
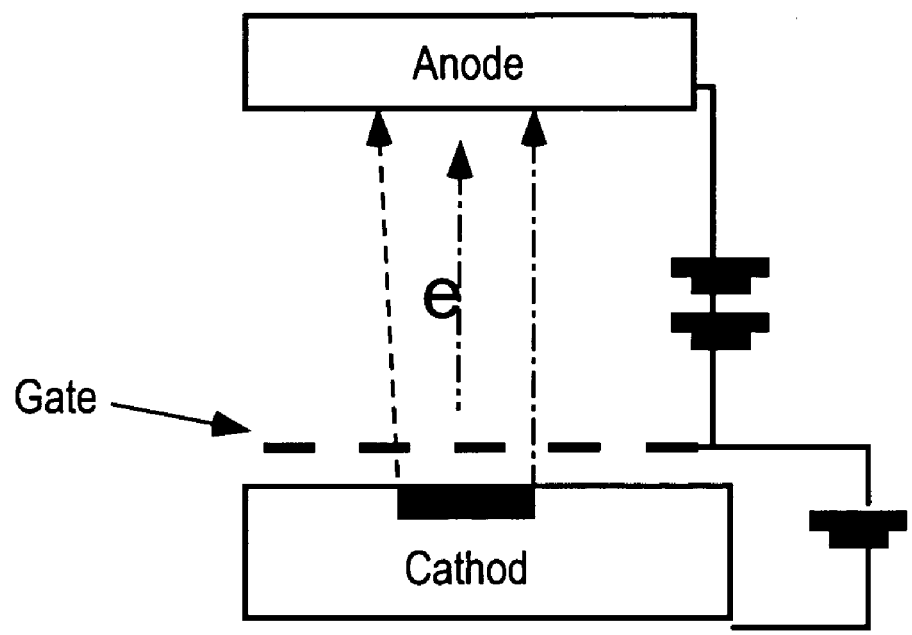
FIG. 7 is a schematic setup for field emission measurements.

The FWNTs fabricated by the process disclosed herein have been measured and their electron field emission properties determined. In one specific example, the measurement was performed following the procedure described below and shown schematically in FIG. 7: The FWNT film deposited on the surface of a conducting substrate was used as a cathode for field emission testing. A mesh grid with certain transmission rate was used as the extraction gate. The gate was built with a typical gap distance of about 100 µm above the field emitters and was isolated from the cathode. In one specific example, the gate was connected to the ground through a 1 MΩ resistor. A negative voltage was applied to the cathode whose surface was coated with carbon nanotube (CNT) emitters. An electric field was created in the space between the gate and the cathode to extract the electrons out of the cathodes. The anode was placed about 1 cm above the gate with an electric potential about 1.5 kilovolts higher than that on the gate. During the operation, a fraction of the emitted electrons was stopped by the mesh grid. Other electrons traveling through the mesh grid were further accelerated by the anode voltage and collected by the anode.

Figure 8:
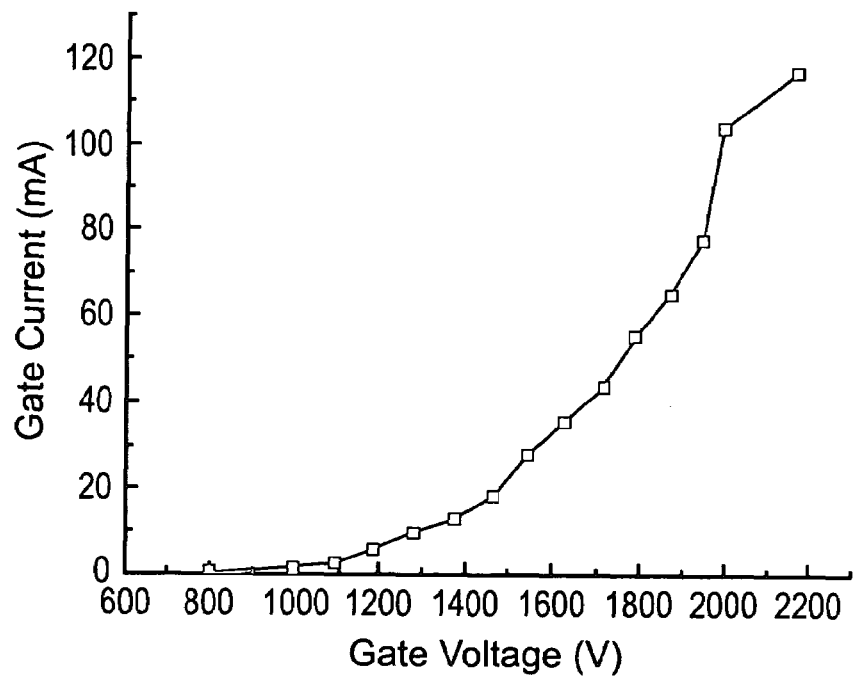
FIG. 8 graphically illustrates the gate current as a function of gate voltage for an emission device, e.g., an electrode, formed with field emissive FWNT material formed by the method disclosed herein. A current over 100 mA and a total emission current over 200 mA (>1500 mA/cm$^2$) was achieved which is substantially higher than the values obtained from MWNTs.

Experiments show that the FWNTs based cathodes are capable of producing very high current. FIG. 8 illustrates that an anode current over 100 mA and a total emission current over 200 mA (>1500 mA/cm$^2$) was achieved with FWNTs. These values are substantially higher than the values obtained from the MWNTs. As reported herein, emission current density has been calculated by normalizing the total measured emission current with the gross surface area of the structure, e.g., the area of the substrate covered with nanotubes.

Figure 9:
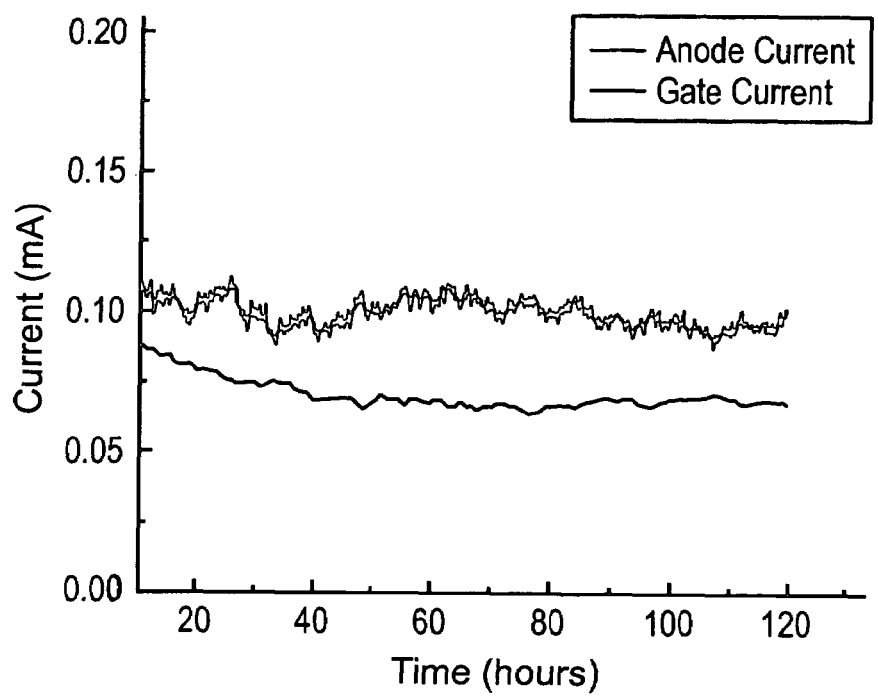
FIG. 9 is a plot showing the long-term stability for field emission from electrodes formed with field emissive FWNT material formed by the method disclosed herein.

FIG. 9 compares the emission stability of cathodes comprising FWNTs and SWNTs. The FWNTs were fabricated consistent with the methods and structures disclosed herein and the SWNTs were fabricated by the laser ablation method. The experiments for both the FWNTs and the SWNTs were conducted under the same conditions. As illustrated in FIG. 9, the cathode comprising the FWNTs shows stable emission under DC mode (100% duty cycle) for over 100 hours without significant long-term decay, e.g., less than ±20%, preferably less than ±10%. This property is highly desirable for device applications.

Figure 10:
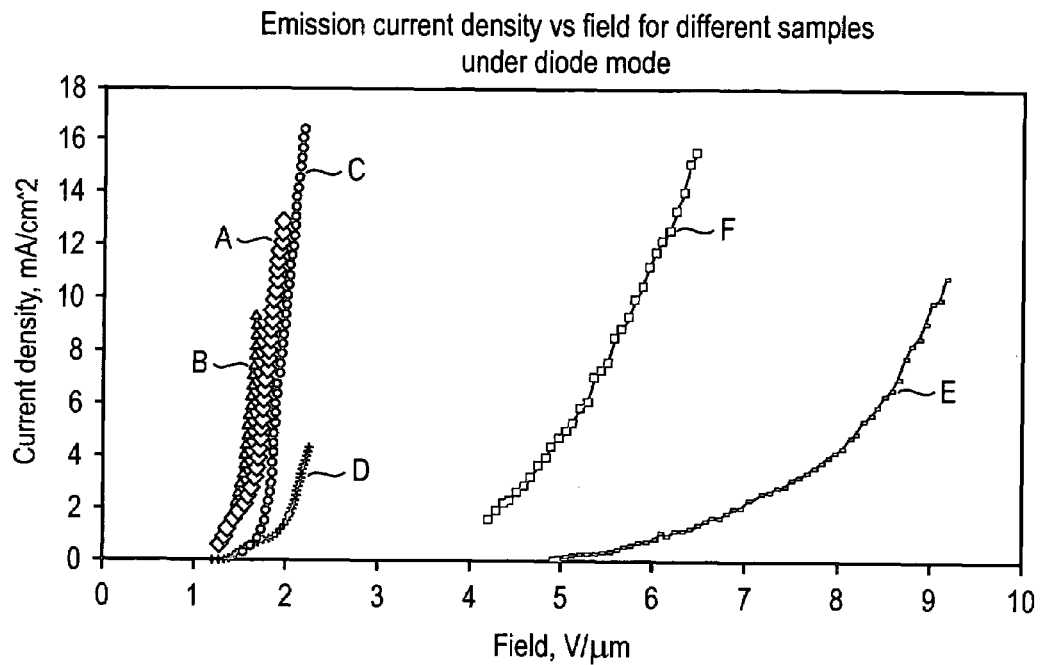
FIG. 10 is a plot of emission current density as a function of field for a diode structure formed with field emissive FWNT material formed by the method disclosed herein as compared to a diode structure formed with SWNT material and commercially available MWNT material.
Figure 11:
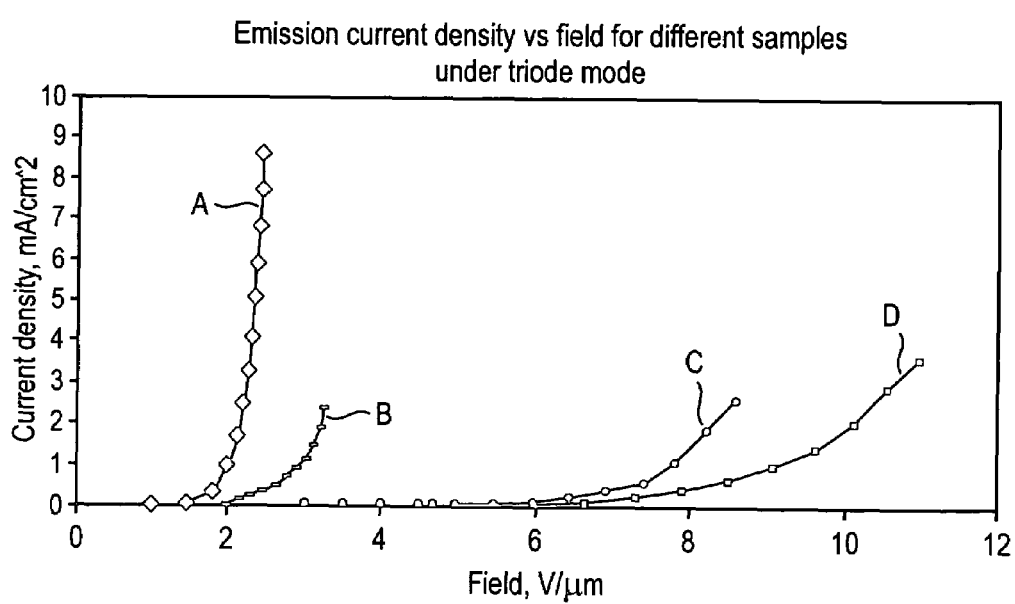
FIG. 11 is a plot of emission current density as a function of field for a triode structure formed with field emissive FWNT material formed by the method disclosed herein as compared to a triode structure formed with SWNT material, MWNT material, and DWNT material.

FIG. 10 is a plot of emission current density as a function of field for a diode structure formed with field emissive FWNT material formed by the method disclosed herein as compared to a diode structure formed with SWNT material and commercially available MWNT material. SWNT bundles (emissive material SWNT #1 to SWNT #3) were fabricated by the laser ablation method and emissive material MWNT #1 and MWNT #2 were commercially obtained samples. All emission current in FIG. 10 was collected under the same experimental conditions. FIG. 11 illustrates that the FWNTs have a similar emission threshold field and a similar or better current density than SWNT bundles and that the emission threshold field and current density are substantially better for FWNTs than the threshold fields and current density at a given field observed from the MWNTs. In FIG. 10, the emission curves from the following materials are labeled as indicated in Table 1.

TABLE 1

| EMISSIVE MATERIAL | EMISSION CURRENT-VOLTAGE CURVE IN FIG. 10 |
|---|---|
| FWNT | A |
| SWNT #1 | B |
| SWNT #2 | C |
| SWNT #3 | D |
| MWNT #1 | E |
| MWNT #2 | F |

FIG. 11 is a plot of emission current density as a function of field for a triode structure formed with field emissive FWNT material formed by the method disclosed herein as compared to a triode structure formed with SWNT material, MWNT material, and DWNT material. SWNT bundles (emissive material SWNT #1) were fabricated by the laser ablation method, emissive material MWNT #1 was commercially obtained sample, and emissive material DWNT #1 was commercially obtained material. All emission current in FIG. 11 was collected under the same experimental conditions. FIG. 11 illustrates that the FWNTs have a similar emission threshold field and a better current density than SWNT bundles and that the emission threshold field and current density are substantially better for FWNTs than the threshold fields and current density at a given field observed from the MWNTs or DWNTs samples. In FIG. 11, the emission curves from the following materials are labeled as indicated in Table 2.

TABLE 2

| EMISSIVE MATERIAL | EMISSION CURRENT-VOLTAGE CURVE IN FIG. 11 |
|---|---|
| FWNT | A |
| SWNT #1 | B |
| MWNT #1 | C |
| DWNT #1 | D |

In summary, we have developed a process for the production of a specific type of nanotubes with small diameter and a few walls—few-walled nanotubes ("FWNTs"). The process of catalyst preparation technique and the growth conditions produce the nanotubes and the structure of the FWNTs produce the observed properties. We have named these nanotubes FWNTs to distinguish them from common MWNTs and SWNTs. The new FWNTs have much enhanced field emission properties compare with other nanotubes.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method of manufacturing carbon nanotubes comprising the steps of:
   (a) producing by a combustion process a catalyst containing Mo and one or more other metals supported on MgO powder;
   (b) using a gas mixture containing carbon-containing gas as a precursor; and
   (c) heating the catalyst and the gas mixture to a temperature above 900° C. to produce a carbon nanotube having an outer diameter equal to or smaller than about 10 nm and the carbon nanotube having from 2 to 5 walls.

2. The method of claim 1, wherein the other metals include Fe and Co.

3. The method of claim 1, wherein the carbon-containing gas includes hydrogen and methane.

4. The method of claim 3, wherein a ratio of hydrogen to methane in the gas mixture is 1 to 20.

5. The method of claim 1, wherein the produced nanotubes have enhanced field emission properties.

6. The method of claim 5, wherein the carbon-containing gas includes hydrogen and methane.

7. The method of claim 6, wherein a ratio of hydrogen to methane in the mixture is 1 to 20.

8. The method of claim 1, wherein the produced carbon nanotube has a current density of no less than about 4 mA/cm$^2$ at an applied field of 1.5 to 3 v/μm when measured using a parallel plate geometry.

9. The method of claim 1, wherein the produced carbon nanotube has an outer diameter equal to or smaller than 10 nm and a number of walls of the nanotube is less than 10.

10. The method of claim 1, wherein the precursor contains oxidizer and organic fuel, wherein the combustion process includes using the precursor to generate a large amount of gaseous byproduct and to produce high surface area solids.

* * * * *